(12) United States Patent
Burch et al.

(10) Patent No.: US 7,437,486 B2
(45) Date of Patent: Oct. 14, 2008

(54) CONFIGURABLE MEASUREMENT INTERFACE COUPLED TO A FRONT-END SUBSYSTEM AND A BACK-END SUBSYSTEM FOR RECEIVING A SET OF BOOTSTRAP INFORMATION

(75) Inventors: Jefferson B. Burch, Palo Alto, CA (US); Glenn R. Engel, S.E. Snohomish, WA (US); Glen L. Purdy, Jr., S.E. Snohomish, WA (US)

(73) Assignee: Agilent Technologies, Inc., Santa Clara, CA (US)

( * ) Notice: Subject to any disclaimer, the term of this patent is extended or adjusted under 35 U.S.C. 154(b) by 168 days.

(21) Appl. No.: 10/744,810

(22) Filed: Dec. 23, 2003

(65) Prior Publication Data

US 2005/0137822 A1    Jun. 23, 2005

(51) Int. Cl.
   *G06F 13/00*    (2006.01)
   *G06F 15/00*    (2006.01)
(52) U.S. Cl. .................. 710/8; 710/9; 710/10; 710/15; 710/16; 710/17; 710/18; 710/31; 709/202; 709/217; 716/16
(58) Field of Classification Search ............... 710/8–10, 710/15–18, 31; 709/202, 217; 716/16
   See application file for complete search history.

(56) References Cited

U.S. PATENT DOCUMENTS 5,471,615 A * 11/1995 Amatsu et al. ............... 709/202
5,870,609 A    2/1999  Thornton et al.
6,742,173 B2 *  5/2004  Spivey ......................... 716/16
2003/0163298 A1  8/2003  Odom et al.

FOREIGN PATENT DOCUMENTS

JP    2003 099278    4/2003

OTHER PUBLICATIONS

Andrew S. Tanenbaum, "Structured Computer Organization", third edition, 1976, pp. 11-13.*
Kang Lee, "IEEE 1451:A Standard in Support of Smart Transducer Networking", May 1-4, 2000.*

* cited by examiner

*Primary Examiner*—Tammara R Peyton (57) ABSTRACT

A measurement device having a configurable measurement interface that enables the dynamic allocation of responsibilities among front-end and back-end subsystems of a measurement device. A measurement device according to the present teachings includes a front-end subsystem for performing an interaction with a physical environment and back-end subsystem having a set of resources for supporting the front-end subsystem. The front-end and back-end subsystems are coupled to and communicate through a measurement interface. The front-end subsystem transfers a set of bootstrap information via the measurement interface to the back-end subsystem and in response the back-end subsystem configures the resources to support the front-end subsystem.

12 Claims, 6 Drawing Sheets

FIG. 1

```
┌─────────────────────────────────────┐
│   Provide a Set of Bootstrap Lines  │
│ and Allocatable Lines Between Subsystems │
│                 100                 │
└─────────────────────────────────────┘
                  │
                  ▼
┌─────────────────────────────────────┐
│   Place the Allocatable Lines in    │
│      a High Impedance State         │
│                 102                 │
└─────────────────────────────────────┘
                  │
                  ▼
┌─────────────────────────────────────┐
│     Transfer a Set of Information   │
│         Via the Bootstrap Lines     │
│                 104                 │
└─────────────────────────────────────┘
                  │
                  ▼
┌─────────────────────────────────────┐
│  Initialize a Programmable Environment │
│     in Response to the Information  │
│                 106                 │
└─────────────────────────────────────┘
                  │
                  ▼
┌─────────────────────────────────────┐
│   Release the Allocatable Lines from │
│ the High Impedance State and Startup │
│                 108                 │
└─────────────────────────────────────┘
```

CONFIGURABLE MEASUREMENT INTERFACE COUPLED TO A FRONT-END SUBSYSTEM AND A BACK-END SUBSYSTEM FOR RECEIVING A SET OF BOOTSTRAP INFORMATION

BACKGROUND

A wide variety of measurement devices may be arranged into separate subsystems that interact with one another via a measurement interface. For example, a wide variety of measurement devices, smart sensors, data acquisition systems, etc., may be arranged into a front-end subsystem and a back-end subsystem that communicate via a well-defined measurement interface. A measurement interface may be said to be well-defined if it provides a structure and protocol that enables a relatively independent design and deployment of the measurement device subsystems.

One example of a well-defined measurement interface is one defined in the IEEE 1451.2 standard. The IEEE 1451.2 standard provides a measurement interface between a front-end subsystem (STIM) and a back-end subsystem (NCAP) of a measurement device. The IEEE 1451.2 standard sets forth a structure and protocol that enables an STIM to advertise to an NCAP an arrangement of measurement channels, measurement units, and speed and accuracy parameters using a transducer electronic data sheet (TEDS).

The IEEE 1451.2 standard provides a relatively fixed allocation of responsibilities among an STIM and an NCAP. The responsibilities of an STIM may include generating raw data, e.g. via sensors, applying stimuli, e.g. via actuators, performing signal conditioning, sample and hold and buffering functions, digital-analog conversion, etc. The responsibilities of an NCAP may include converting raw data obtained from an STIM to engineering quantities, analyzing and transforming data, detecting alarms, etc.

A relatively fixed allocation of responsibilities among the front-end and back-end subsystems of a measurement device may limit the ability of designers to add more elaborate measurement functionality to a measurement device without imposing a significant increase in the complexity of the front-end subsystem of the measurement device. Unfortunately, an increase in the complexity of a front-end subsystem of a measurement device may increase development time and the overall cost a measurement device.

SUMMARY OF THE INVENTION

A measurement device is disclosed having a configurable measurement interface that enables the dynamic allocation of responsibilities among front-end and back-end subsystems of a measurement device. A configurable measurement interface according to the present teachings enables the design of a measurement device that performs elaborate measurements without requiring an increase in the complexity of the front-end subsystem of the measurement device. A measurement device according to the present teachings includes a front-end subsystem for performing an interaction with a physical environment and back-end subsystem having a set of resources for supporting the front-end subsystem. The front-end and back-end subsystems are coupled to a measurement interface. The front-end subsystem transfers a set of bootstrap information via the measurement interface to the back-end subsystem and in response the back-end subsystem configures the resources to support the front-end subsystem.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
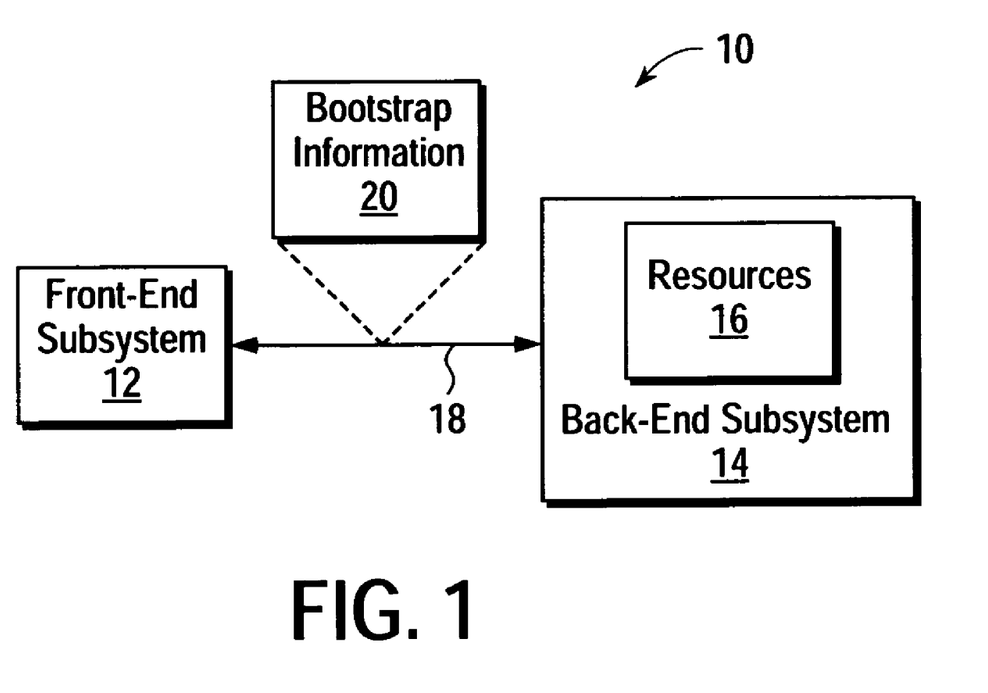
FIG. 1 shows a measurement device that incorporates the present techniques.

FIG. 1 shows a measurement device 10 that incorporates the present techniques. The measurement device 10 includes a front-end subsystem 12 and a back-end subsystem 14. The front-end and back-end subsystems 12-14 are interconnected via a measurement interface 18. The front-end subsystem 12 includes mechanisms for performing interactions with a physical environment and the back-end subsystem 14 includes a set of resources 16 for supporting the front-end subsystem 12. The front-end subsystem 12 dynamically configures the support functions of the resources 16 by transferring a set of bootstrap information 20 to the back-end subsystem 14 via the measurement interface 18.

The front-end subsystem 12 may use the bootstrap information 20 to adapt the functions performed by the resources 16 in the back-end subsystem 14 to the needs a particular application performed in the front-end subsystem 12. Examples of a functions that may be performed by the resources 16 and configured using the bootstrap information 20 are numerous.

One example of a function that may be performed by the resources 16 is an allocation of interface lines in the measurement interface 18. For example, different implementations of the front-end subsystem 12 may require different data paths, e.g. serial, 8, 16, 32 parallel, and/or different timing, signaling requirements, etc.

Another example of a function that may be performed by the resources 16 is a signaling protocol for a time-stamp function. For example, if a measurement application requires time-stamps for several events detected or generated in the front-end subsystem 12, then the resources 16 may include multiple time-stamp registers and associated trigger signals.

Another example of a function that may be performed by the resources 16 is a detection of patterns in a set of data acquired by the front-end subsystem 12. For example, if a measurement application requires detection of alarms or conditions or other events by the pattern of data sampled by the front-end subsystem 12, then the resources 16 may perform pattern matching on the sampled data as it is transferred to the back-end subsystem 14 via the measurement interface 18.

Yet another example of a function that may be performed by the resources 16 is a scaling/conversion, etc., of digital data acquired by the front-end subsystem 12.

Other examples of a function that may be performed by the resources 16 include communication functions, data encryption/decryption functions, security functions, etc.

The bootstrap information 20 may include a set of programming data. For example, the resources 16 may include a programmable logic device and the bootstrap information 20 may include programming data, e.g. pattern mask data, for the programmable logic device. In another example, the resources 16 may include a processor, e.g. CPU or specialized processor, and the bootstrap information 20 may include code to be executed by the processor in the resources 16.

The bootstrap information 20 may include an identifier that enables the back-end subsystem 14 to obtain a set of programming data. For example, the bootstrap information 20 may be used to identify the front-end subsystem 12 so that the back-end subsystem 14 can look up programming data, e.g. pattern mask, code, etc., from a persistent memory in the back-end subsystem 14 or from a server that is accessible by the back-end subsystem 14.

The bootstrap information 20 may include a checksum that enables the back-end subsystem 14 verify whether a set of programming data stored in the back-end subsystem 14 is the correct programming data for the front-end subsystem 12. For example, the back-end subsystem 14 may compare the checksum obtained from the front-end subsystem 12 in the bootstrap information 20 to a checksum calculated for the programming data contained in its local persistent memory, e.g. EPROM.

The bootstrap information 20 may include information that enables the back-end subsystem 14 to generate a set of programming data. For example, the bootstrap information 20 may include a set of Boolean expressions that enable the back-end subsystem 14 to generate programming data for a programmable logic device. In another example, the bootstrap information 20 may include source code that the back-end subsystem 14 compiles into object code to be executed by a processor.

Examples of mechanisms in the front-end subsystem 12 for performing interactions with a physical environment are numerous and include sensors, actuators, as well as controllers that may process information pertaining to sensors and actuators. Examples of sensors and actuators that may be employed in the front-end subsystem 12 are too numerous to mention.

Figure 2:
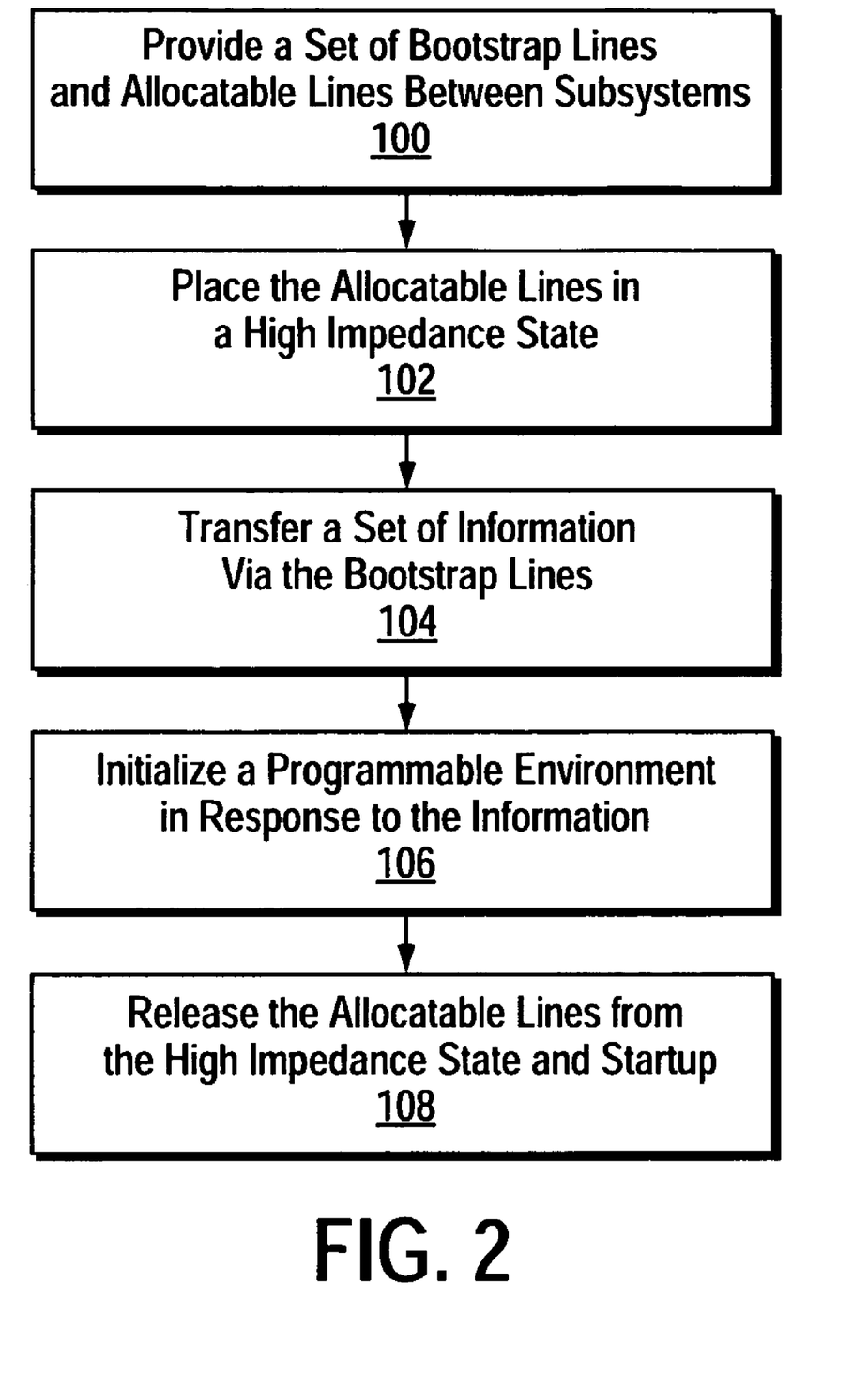
FIG. 2 shows a method configuring a measurement interface in a measurement device according to the present teachings.

FIG. 2 shows a method for configuring a measurement interface between the front-end subsystem 12 and the back-end subsystem 14 according to the present teachings.

At step 100, a set of bootstrap lines and a set of allocatable lines are provided in the measurement interface 18 between the front-end and back-end subsystems 12-14. The measurement interface 18 may also include power and ground lines for the front-end subsystem 12. The arrangement of the bootstrap lines may be, for example, 3 wires including clock, data in, data out, or 2 wire half-duplex with clock, or 1 wire asynchronous half-duplex with no clock.

At step 102, the back-end subsystem 14 places the allocatable lines of the measurement interface 18 into a high impedance state.

At step 104, the front-end subsystem 12 transfers the bootstrap information 20 to the back-end subsystem 14 via the bootstrap lines of the measurement interface 18. The bootstrap information 20 may be a set of programming data and/or a set of Boolean expressions for a set of programmable logic, a set of object code and/or source code for a processor, a checksum for a programmable memory, or a unique identifier associated with the front-end subsystem 12, to name a few examples.

At step 106, the back-end subsystem 14 initializes a programmable environment to perform the appropriate functions in response to the bootstrap information 20 from the front-end subsystem 12. Step 106 may include initializing an interrupt service routine for a processor in the back-end subsystem 14. Step 106 may include initializing a real-time thread for a processor in the back-end subsystem 14. Step 106 may include providing a set of programming data to a set of programmable logic in the back-end subsystem 14. Step 106 may include compiling source code into object code and/or compiling Boolean expressions into programming data. Step 106 may include obtaining code or data from a local memory or from a remote server.

At step 108, the back-end subsystem 14 releases the allocatable lines of the measurement interface 18 from the high impedance state and transfers a signal to the front-end subsystem 12 that causes the front-end subsystem 12 to startup. The startup signal may be transferred to the front-end subsystem 12 via the bootstrap lines of the measurement interface 18.

Figure 3:
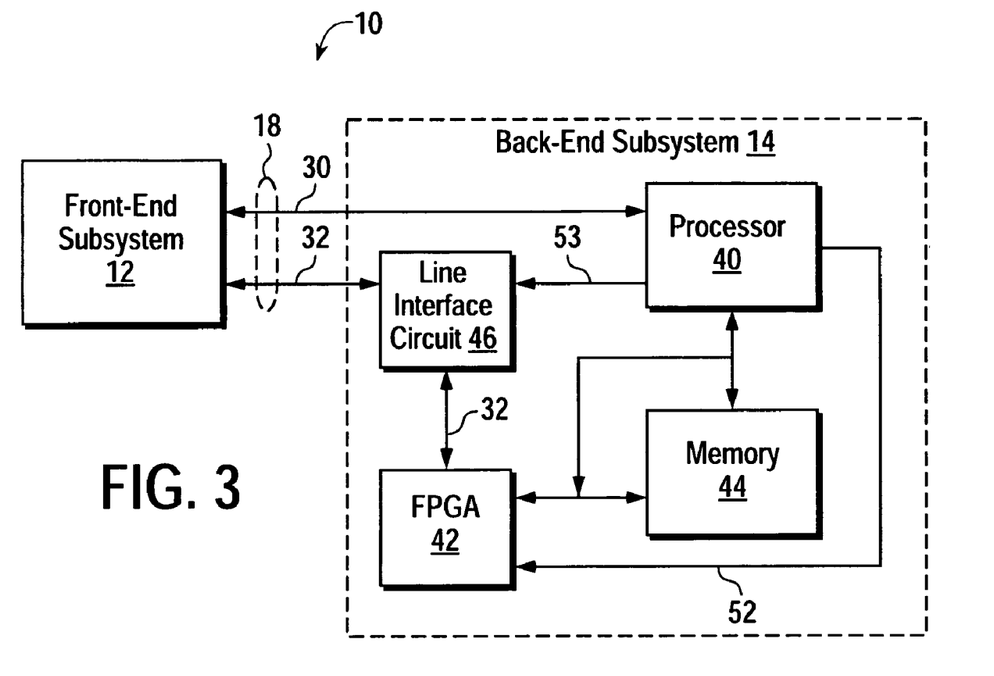
FIG. 3 shows one embodiment of a back-end subsystem of a measurement device according to the present teachings.

FIG. 3 shows one embodiment of the back-end subsystem 14 of the measurement device 10 according to the present teachings. The resources 16 in the back-end subsystem 14 in the embodiment shown includes a processor 40, an FPGA 42, a memory 44, and a line interface circuit 46.

The measurement interface 18 include a set of bootstrap lines 30 and a set of allocatable lines 32. The line interface circuit 46 places the allocatable lines 32 in a high impedance state and releases the high impedance state in response to control signals 53 from the processor 40.

The processor 40 obtains the bootstrap information 20 from the front-end subsystem 12 via the bootstrap lines 30. The processor 40 includes resident code for handling the bootstrap information 20 according to the methods steps set forth above.

For example, if the bootstrap information 20 includes a set of programming data for the FPGA 42 then the processor 40 starts up the FPGA 42 using control signals 52 and feeds the programming data to the FPGA 42. The processor 40 may store the obtained programming data into the memory 44, e.g. a persistent memory, to obviate the need to obtain the programming data from the front-end subsystem 12 at the next startup.

If the bootstrap information 20 includes a set of Boolean expressions that define the desired functions to be preformed in the FPGA 42 then the processor 40 compiles the Boolean expressions into programming data and starts up the FPGA 42 and feeds the programming data to the FPGA 42. The processor 40 may store the compiled programming data into the memory 44 to obviate the need to re-compile the programming data at the next startup of the front-end subsystem 12. The processor 40 may use a compiler that is implemented on a remote server to compile the Boolean expressions obtained from the front-end subsystem 12.

If the bootstrap information 20 includes a checksum for a set of programming data for the FPGA 42 then the processor 40 computes a checksum on a set of programming data already stored in the memory 44. If the checksums match then the processor 40 starts up the FPGA 42 and feeds the programming data to the FPGA 42. If the checksums do not match then the processor 40 sends a message to the front-end subsystem 12 via the bootstrap lines 30 that cause the front-end subsystem 12 to send the appropriate programming data or Boolean expressions to the back-end subsystem 14.

If the bootstrap information 20 includes a unique identifier for the front-end subsystem 12 then the processor 40 may search one or more sets of programming data already stored in the memory 44 for a set of programming data for the FPGA 42 that is associated with the unique identifier. If the appropriate set of programming data is found then the processor 40 starts up the FPGA 42 and feeds that programming data to the FPGA 42. If the appropriate programming data is not found, then the processor 40 may send a message to the front-end subsystem 12 via the bootstrap lines 30 that cause the front-end subsystem 12 to send the appropriate programming data or Boolean expressions to the back-end subsystem 14. The processor 40 may use the unique identifier to obtain the appropriate programming data from a server.

If the bootstrap information 20 includes a set of object code for execution by the processor 40 then the processor 40 installs the object code. The object code may be interrupt service routine code for handling an interrupt from the FPGA 42 or some other device. The object code may be code for a real-time thread. The installation of the object code may include a dynamic linking step that enables the newly installed object code to access data, variables, routines, etc., of an operating system or other software element executing on the processor 40. The processor 40 may store the obtained object data into the memory 44. A persistent memory may be used to obviate the need to obtain and reinstall object code at the next startup of the front-end subsystem 12. The object code may be any type of appropriate object code. For example, the processor 40 may execute a Java virtual machine and the bootstrap information 20 may include Java byte code.

If the bootstrap information 20 includes a set of source code for code to be executed by the processor 40 then the processor 40 compiles the source code into object code and installs the newly compiled object code. The processor 40 may store the newly compiled code into the memory 44 to obviate the need to re-obtain and re-compile source code at the next startup of the front-end subsystem 12. The processor 40 may use a compiler service that is provided on a remote server to compile the source code obtained from the front-end subsystem 12.

If the bootstrap information 20 includes a unique identifier for the front-end subsystem 12 then the processor 40 may search one or more sets of object code already stored in the memory 44 for object code that is associated with the unique identifier. If the appropriate object is not found, then the processor 40 may send a message to the front-end subsystem 12 via the bootstrap lines 30 that cause the front-end subsystem 12 to send the appropriate object code or source code to the back-end subsystem 14. The processor 40 may use the unique identifier to obtain the appropriate object code or source code from a remote server.

Figure 4:
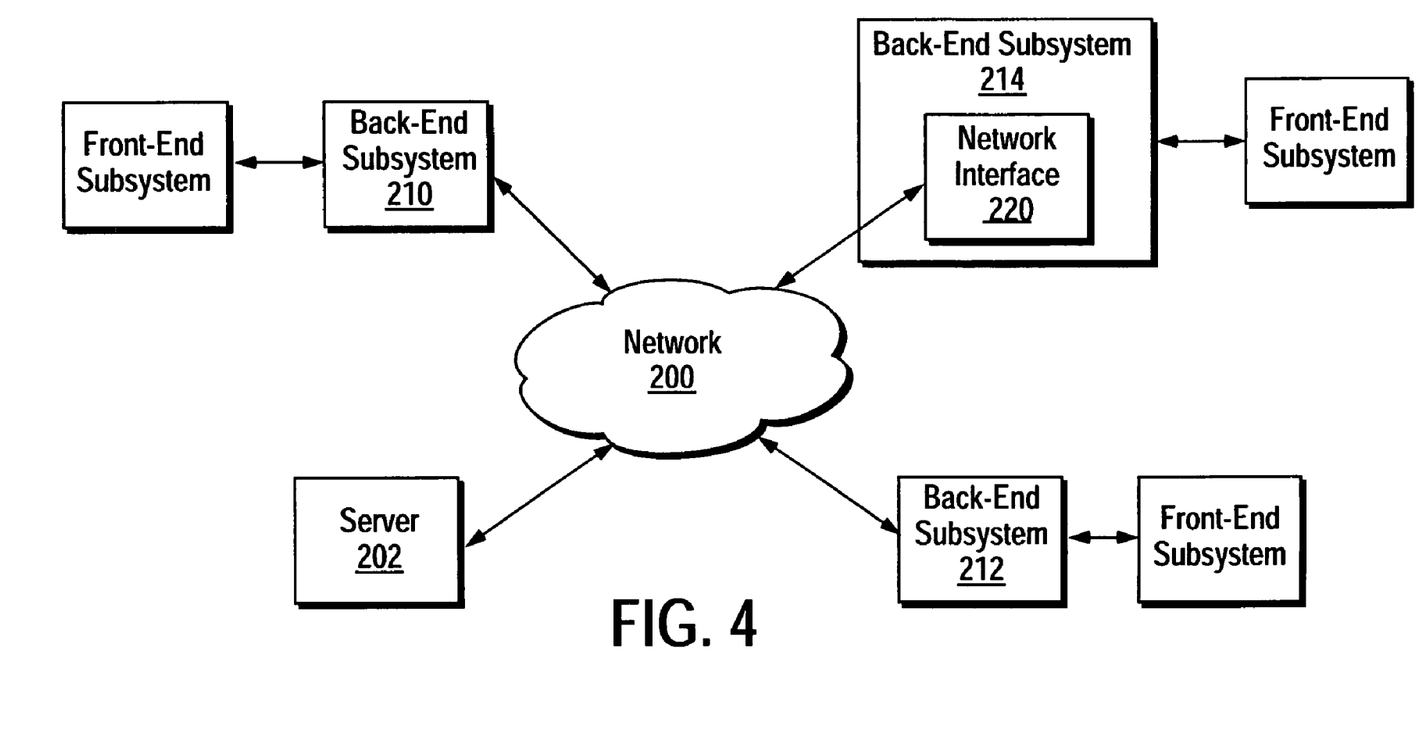
FIG. 4 shows a network of measurement devices each having a configurable measurement interface according to the present teachings.

FIG. 4 shows a network of measurement devices each having an arrangement of back-end subsystems 210-214 and corresponding front-end subsystems according to the present teachings. Each back-end subsystem 210-214 includes a mechanism for communicating via a network 200. For example, the back-end subsystem 214 includes a network interface 220 that is capable of communication via the network 200 according to Internet protocols.

The back-end subsystems 210-214 are each capable of accessing a server 202 using Internet protocols. A back-end subsystem may obtain from the server 202 via the network 200 the programming data, object code, or any other appropriate information for supporting its corresponding front-end subsystem. For example, the server 202 may store multiple sets of programming data or object code each associated with a unique identifier of a front-end subsystem. A back-end subsystem may send a request to the server 202 that includes a unique identifier obtained from its corresponding front-end subsystem in order to identify and obtain the appropriate set of programming data or object code.

The server 202 may provide services for compiling Booleans expressions into programming data and/or for compiling source code into object code. This may be used to relieve a back-end subsystem from the task of performing compilation. Instead, a back-end subsystem sends a set of source code or Boolean expressions obtained from its front-end subsystem to the server 202 with a request that it be compiled. In response the server 202 performs the appropriate compilation and sends the resulting programming data or object code back to the requesting back-end subsystem.

Figure 5:
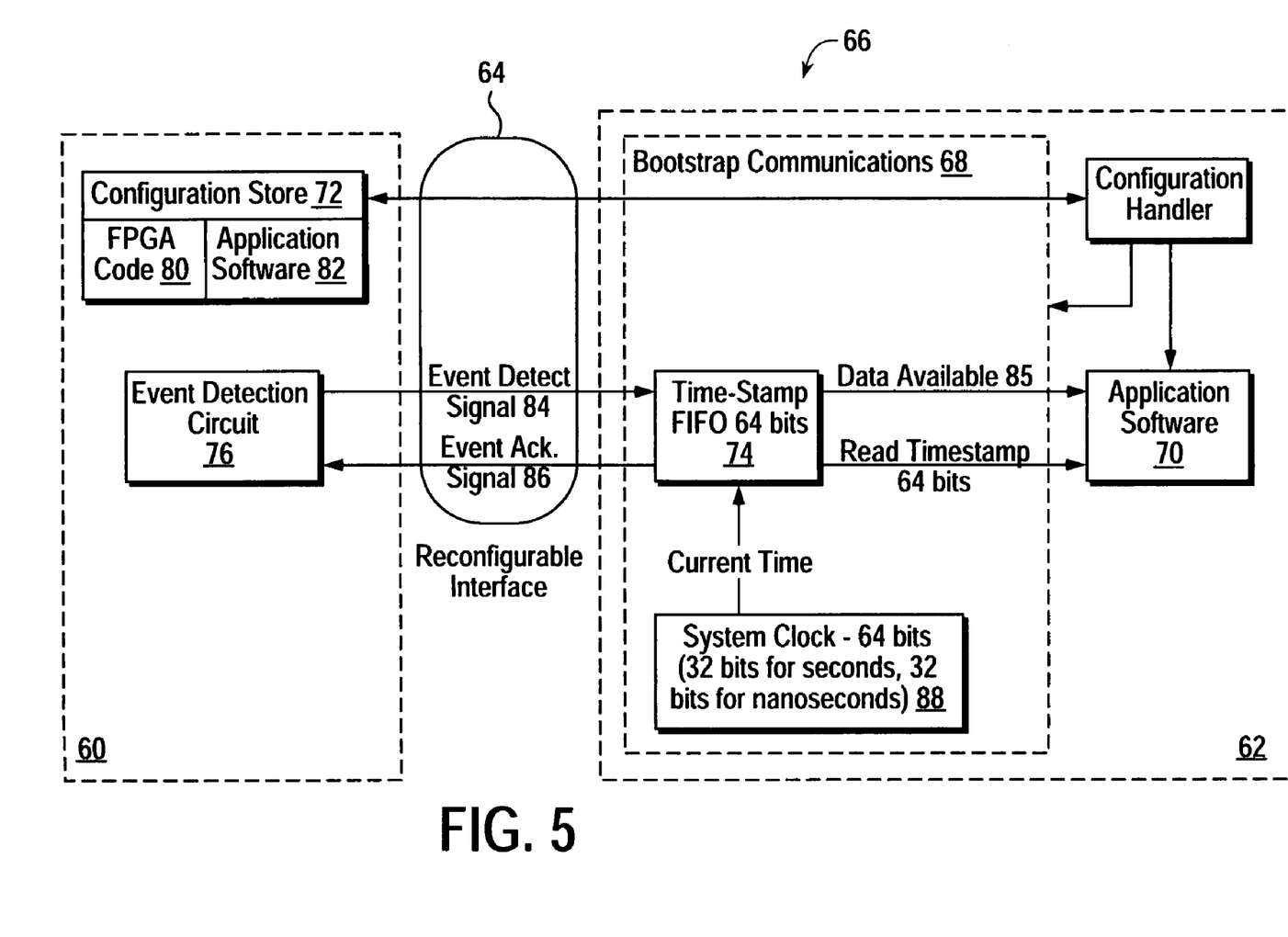
FIG. 5 shows a measurement device according to the present techniques that detects a rapid burst of events and generates and stores a high resolution time-stamp for each event.

FIG. 5 shows a measurement device 66 according to the present techniques that detects a rapid burst of events and generates and stores a high resolution time-stamp for each event. The measurement device 66 includes a front-end subsystem 60 and a back-end subsystem 62 that interact via a measurement interface 64. The measurement device 66 includes an event detection circuit 76 that detects a rapid burst of events.

The measurement interface 64 is a dynamic measurement interface according to the present techniques that enables a designer of the measurement device 66 to avoid the need to unduly increase the complexity of the front-end subsystem 60 to support the time-stamping of a rapid burst of events. Instead, the measurement interface 64 is used by the front-end subsystem 60 to configure an FPGA 68 in the back-end subsystem 62 with a set of FPGA code 80 and to configure a set of new application software 82 in the back-end subsystem 62 to support the time-stamping of a rapid burst of events. The FPGA code 80 and the application software 82 are stored in a configuration store 72 in the front-end subsystem 60. The FPGA code 80 and the application software 82 are loaded via the bootstrap communications lines of the measurement interface 64. The configuration store 72 or an associated element of the front-end subsystem 60 includes the appropriate communication hardware for supporting a particular physical implementation of the bootstrap lines, e.g. ⅔ wire, full/half duplex, etc.

In response to the programming of the FGPA 68 with the new FPGA code from the configuration store 72, a time-stamp FIFO 74 is created in the FPGA 68 and a pair of the allocatable lines of the measurement interface 64 are used as an event detect signal 84 and an event ack signal 86 between the event detection circuit 76 and the time-stamp FIFO 74. The event detect signal 84 is used to indicate when a new event has been detected and the event ack signal 86 is an acknowledge indicator that is used to handshake that the time-stamp FIFO 74 is ready to receive another event detect signal. The time-stamp FIFO 74 obtains a value of the current time from a system clock 88 for each detected event and stores it into the time-stamp FIFO 74.

The time-stamp FIFO 74 presents an interface to the application software 70, i.e. the installed application software 82, running on the back-end subsystem 62. The application software 70 interacts with the time-stamp FIFO 74 through a set of memory mapped FPGA registers. A data available signal 85 causes the processor in the back-end subsystem 62 to fire an interrupt that wakes up the application software 70. A read time-stamp register of the FPGA 68 is accessed by the application software 70 to retrieve the hardware time-stamp.

Figure 6:
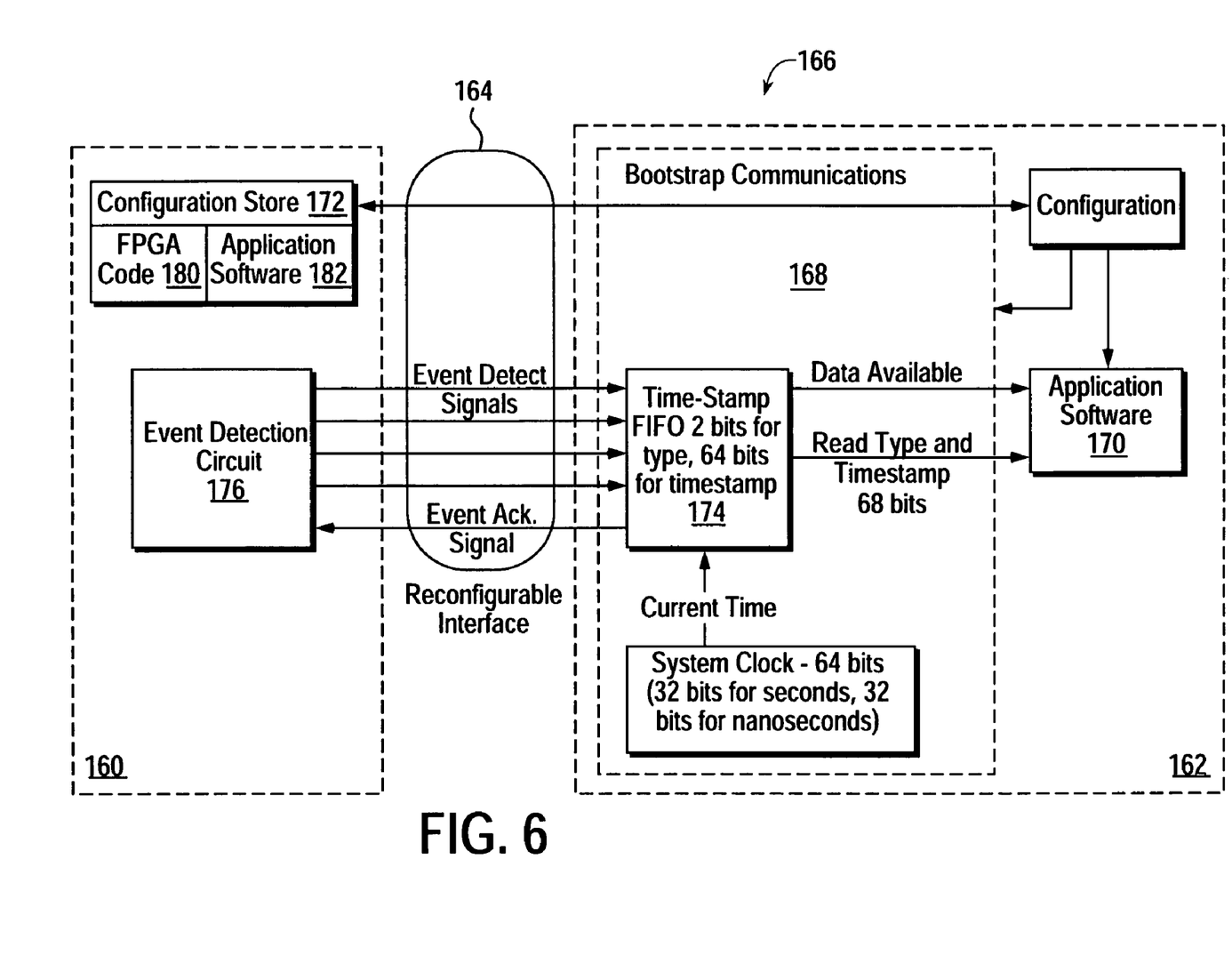
FIG. 6 shows a measurement device according to the present techniques that detects a rapid burst of events of different types and generates and stores a high resolution time-stamp for each event.

FIG. 6 shows a measurement device 166 according to the present techniques that detects a rapid burst of events of different types and generates and stores a high resolution time-stamp for each event. The measurement device 164 includes a front-end subsystem 160 having an event detection circuit 176 that detects a rapid burst of events of different types. The front-end subsystem 160 is coupled to a back-end subsystem 162 via a measurement interface 166 according to the present techniques.

The back-end subsystem 162 may be substantially similar to the back-end subsystem 62 shown above, e.g. may have substantially similar resources, FPGA, processor, etc., for providing dynamic support to a front-end subsystem. Alternatively, the back-end subsystem 62 may be re-used to construct the measurement device 166 with the front-end subsystem 160. In either case, the front-end subsystem 160 includes a configuration store 172 that provides a set of FPGA code 180 and a set of application software 182 that is used to configure the back-end subsystem 62 or 162 to support the rapid time-stamping of the different types of events detected by the event detection circuit 176.

The programming of an FPGA 168 in the back-end subsystem 162 with the FPGA code 180 creates a FIFO 174 for storing both a type of event indicator as well as a corresponding timestamp. In this example, the event detection circuit 174 is capable of detecting 4 different types of events. Consequently, 4 different event detect signals are provided via the allocatable lines of the measurement interface 164. The FIFO 168 is expanded, in comparison to the FIFO 74 of the measurement device 66, to include additional bits to store the type information. Similarly, the FIFO interface register accessed by the application software 170 provides this information as well.

The front-end subsystem 160 is simplified by using a separate allocatable line for each type of event. In other embodiments, the event detection signals may be treated as a data bus that contain the type number for each class of event. For example, with 4 lines, up to 16 different event types could be communicated.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A measurement device, comprising:
    front-end subsystem coupled to a measurement interface, the front-end subsystem for performing an interaction with a physical environment;
    back-end subsystem coupled to the measurement interface and having a set of resources for supporting the front-end subsystem such that the back-end subsystem receives a set of bootstrap information via the measurement interface from the front-end subsystem and in response configures the resources to support the front-end subsystem.

2. The measurement device of claim 1, wherein the bootstrap information comprises a set of programming data for the resources in the back-end subsystem.

3. The measurement device of claim 1, wherein the bootstrap information comprises an identifier that enables the back-end subsystem to obtain a set of programming data for the resources in the back-end subsystem.

4. The measurement device of claim 3, wherein the identifier enables the back-end subsystem to obtain the programming data from a server.

5. The measurement device of claim 3, wherein the back-end subsystem includes a persistent memory such that the identifier enables the back-end subsystem to obtain the programming data from the persistent memory.

6. The measurement device of claim 1, wherein the bootstrap information comprises a set of programming data for the resources in the back-end subsystem and the back-end subsystem includes a persistent memory for storing the programming data.

7. The measurement device of claim 1, wherein the bootstrap information enables the back-end subsystem to generate a set of programming data for the resources in the back-end subsystem.

8. The front-end subsystem for a measurement device that interacts with a physical environment, the front-end subsystem generating a set of bootstrap information on a measurement interface of the measurement device such that the bootstrap information enables a back-end subsystem of the measurement device to configure resources to support the front-end subsystem.

9. The front-end subsystem of claim 8, comprising a configuration store for storing the bootstrap information.

10. The front-end subsystem of claim 8, wherein the bootstrap information comprises a set of programming data for a set of resources in the back-end subsystem.

11. The front-end subsystem of claim 8, wherein the bootstrap information comprises an identifier that enables the back-end subsystem to obtain a set of programming data for a set of resources in the back-end subsystem.

12. The front-end subsystem of claim 8, wherein the bootstrap information enables the back-end subsystem to generate a set of programming data for a set of resources in the back-end subsystem.

* * * * *

UNITED STATES PATENT AND TRADEMARK OFFICE
CERTIFICATE OF CORRECTION

| | |
|---|---|
| PATENT NO. | : 7,437,486 B2 |
| APPLICATION NO. | : 10/744810 |
| DATED | : October 14, 2008 |
| INVENTOR(S) | : Burch et al. |

Page 1 of 1

It is certified that error appears in the above-identified patent and that said Letters Patent is hereby corrected as shown below:

In column 8, line 28, in Claim 8, delete "The" and insert -- A --, therefor.

Signed and Sealed this

Twenty-fourth Day of February, 2009

JOHN DOLL
*Acting Director of the United States Patent and Trademark Office*